Jan. 17, 1950
A. W. HAPPEL
2,494,706
UNIDIRECTIONAL DUAL SELECTIVE DRIVE
FOR DUAL TABLE GLASS MACHINES
Filed Jan. 26, 1948
3 Sheets-Sheet 2
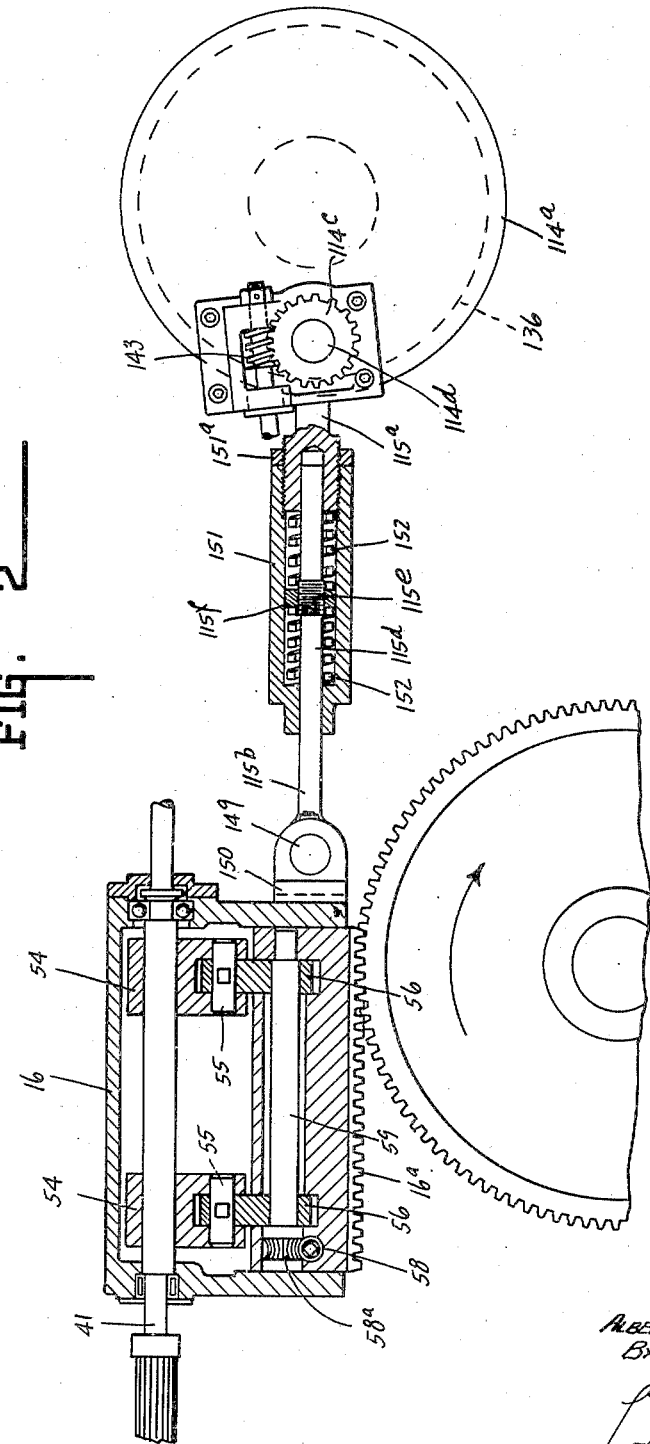
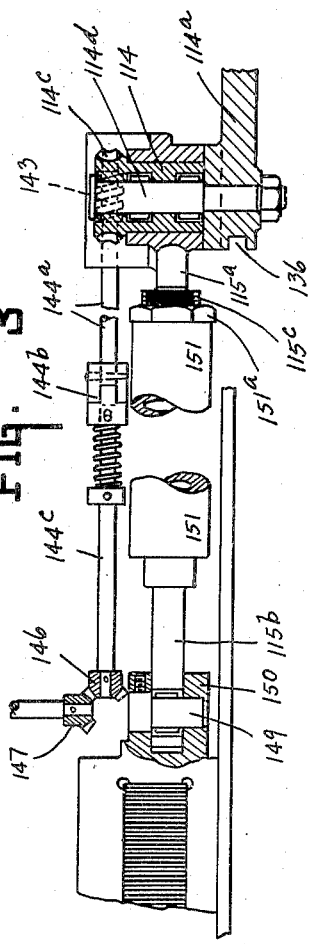
INVENTOR.
ALBERT WILHELM HAPPEL, DECEASED
BY HEDWIG HAPPEL, EXECUTRIX
BY
Lockwood, Goldsmith & Galt,
ATTORNEYS.

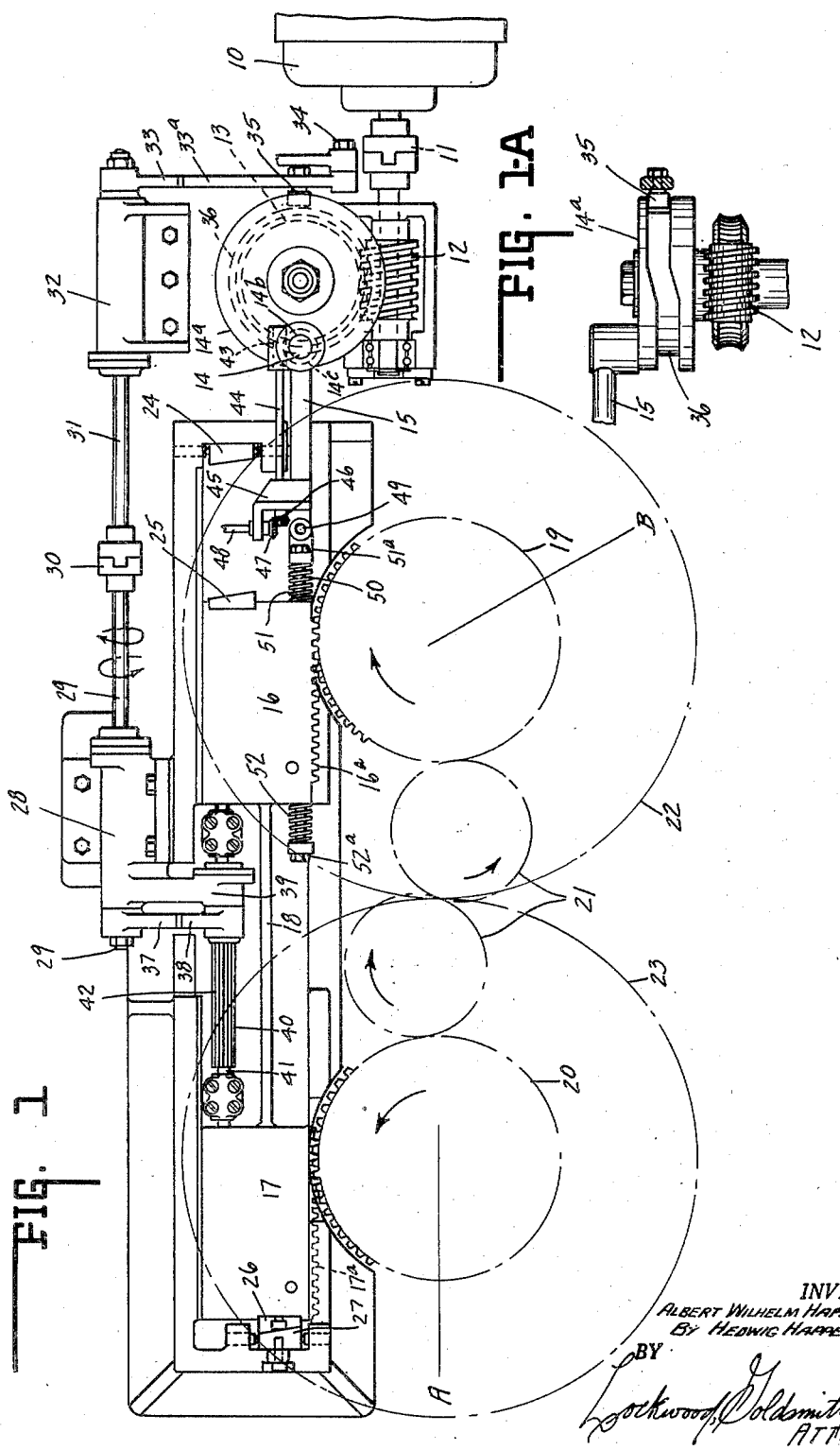

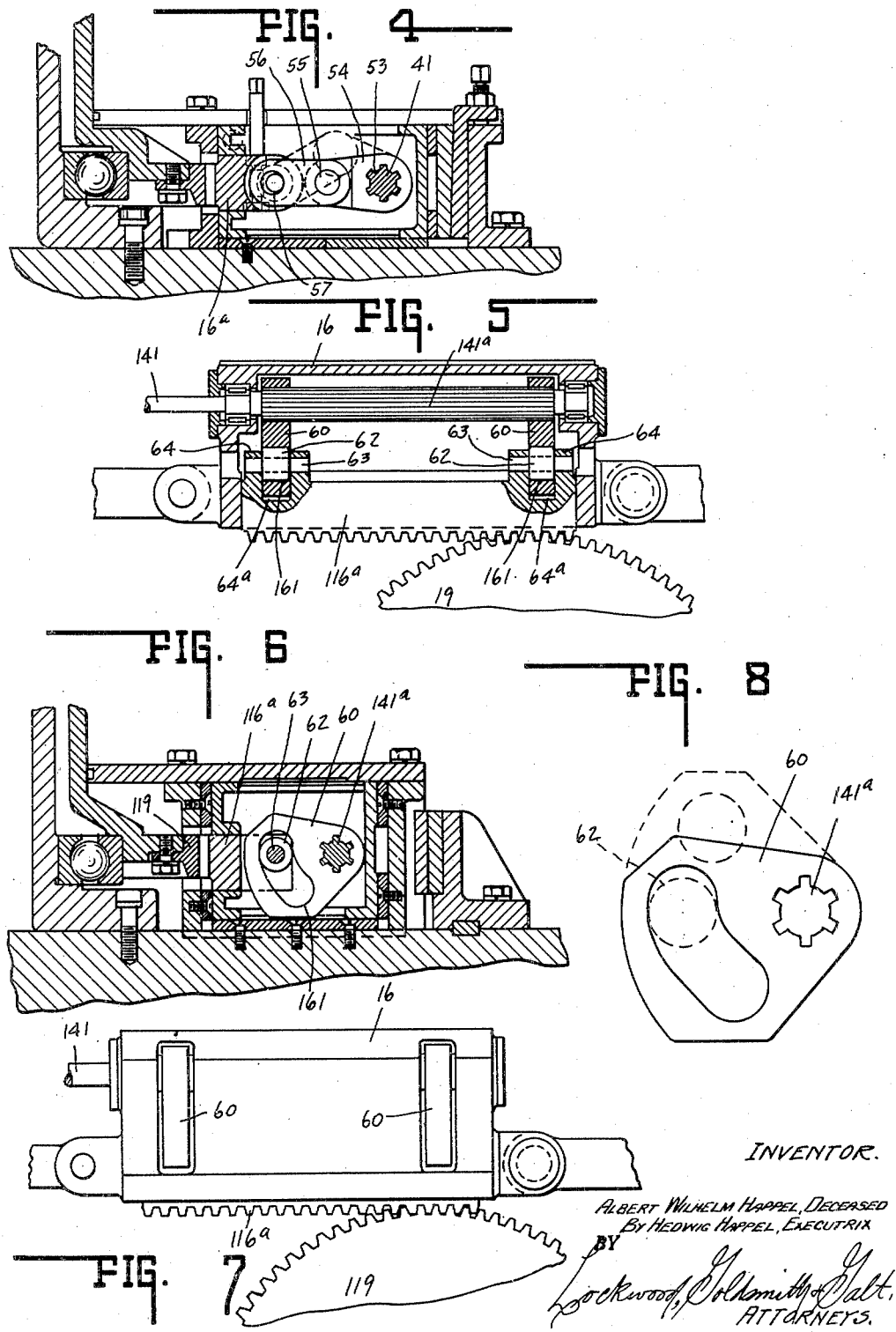

Patented Jan. 17, 1950

2,494,706

UNITED STATES PATENT OFFICE 2,494,706

UNIDIRECTIONAL DUAL SELECTIVE DRIVE FOR DUAL TABLE GLASS MACHINES

Albert Wilhelm Happel, deceased, late of Anderson, Ind., by Hedwig Happel, executrix, Anderson, Ind., assignor to Lynch Corporation, Anderson, Ind.

Application January 26, 1948, Serial No. 4,238

11 Claims. (Cl. 74—84)

1

This invention relates to a drive mechanism for a turret type glass forming machine.

The chief object of the present invention is to eliminate the disadvantages inherent in such a machine. Such a machine includes a single turret with racks disposed on opposite sides of the driving gear and in two planes, the gear being shiftable from one plane to the other for alternate rack engagement, that is one rack at a time. Such shifting of this gear mass limits the practical cycle speed. A variation of such a drive is to tilt selectively the racks in and out of mesh by rotating the yoke carrying the racks through an arc. While the disadvantages of high mass shifting are thereby eliminated other difficulties are now introduced such as necessary accuracy required for full and square tooth engagement etc.

The chief feature of the present invention resides in including two table gears and a pair of racks upon the same side thereof and simultaneously reciprocable, one rack being meshed with and demeshed from one table gear while the other rack is demeshed from and in mesh with the other table gear, respectively, the two gears operatively meshing, so that each in turn drives the other.

Thus for each reciprocation of the racks the two tables are twice advanced in the directions of their rotations. During the dwell periods at the ends of the rack travel, the racks are selectively moved into and out of gear engagement and thus rack shifting movement only requires rack movement to the extent of the rack tooth depth plus adequate clearance. Obviously one rack pushes one gear and the other rack pulls the other gear and a single reciprocatory power effects simultaneous rack travel.

Thus the time required for rack meshing and demeshing can be materially reduced and of course the shiftable mass is very small so that much greater speeds can be utilized without creating dangerous accelerations.

Having set forth the main objective and primary feature of the present invention reference will be had to other objects and features as will more fully appear from the subsequent description.

The full nature of the invention will be understood from the accompanying drawings and the following description and claims:

In the drawings Fig. 1 is a top plan view of the primary portions of the invention.

Fig. 1A is a side elevation of the rack engaging and disengaging power cam and follower.

2

Fig. 2 is a top plan view of a modified form of power, including an adjustable eccentric, for rack reciprocation.

Fig. 3 is an elevational view thereof, parts being shown in central section.

Fig. 4 is a transverse sectional view of a toggle type rack meshing-demeshing mechanism.

Fig. 5 is a longitudinal sectional view of a cam type rack meshing and demeshing mechanism.

Fig. 6 is a transverse sectional view thereof.

Fig. 7 is a top plan view with cover removed.

Fig. 8 is an enlarged side elevation of one of the rack shifting cams.

Herein two embodiments of the invention are illustrated, to wit, rack movement, other than reciprocation for power purposes, being effected by a toggle link mechanism and by a cam mechanism. Reference will first be had to the toggle type.

In Fig. 1, 10 indicates a motor clutched at 11 to a main drive worm 12 meshing with worm wheel 13. An eccentric pin 14 is rotated thereby and pitman 15 is reciprocated and is operatively connected to two slides 16 and 17 through member 18.

Within each slide is a rack 16a and 17a adapted to be meshed with and demeshed from the associated gears 19 and 20. These two gears are intergeared by pinions 21. Thus the blow table 22 and blank table 23 rotate simultaneously with an intermittent or step by step motion.

The gob is supplied to the parison molds on the blank table at station A and transferred to the blow molds on the blow table where the tables are tangential to each other and the blown ware is taken out or discharged at station B. By this arrangement the maximum dwell period is determined only by the time required for the speed of gob supply, transfer or take-out as it were thereby permitting the machine speed to be a maximum.

The dwell period is determined by the eccentric 14 at opposite sides of the worm wheel 13 and the intermediate portions or rather travel of the pin determines the length of stroke. The speed of rotation determines the number of rack reciprocations. 24—25 indicate cooperative stops for limiting rack travel to the right. 26—27 indicate cooperative stops for limiting rack travel to the left. Oscillatably mounted in housing 28 is rock shaft 29 clutched at 30 to rock shaft 31 oscillatably supported in housing 32.

The exposed end of shaft 31 mounts gear segment 33 meshing with gear segment 33a pivoted at 34. Same carries outboard follower (roller)

35 that rides in cam groove 36, see Fig. 1A, in the eccentric wheel 14a. Thus shaft 31—29 is oscillated to and fro and gear segment 37 meshing with gear segment 38, pivoted in bracket 39 and having a spline formation 40, rocks shaft 41 through spline 42. Shaft 41 slides to and fro through segment 38 as the slides are reciprocated with the included racks.

Pin 14 includes an eccentric mounting 14b upon a plate 14a and a worm wheel 14c meshes with worm 43 carried by shaft 44 rotatable in bracket 45 rigid with pitman 15. Bevel gear 46 on shaft 44 meshes with bevel gear 47 on shaft 48 also mounted in bracket 45. Shaft 48 may have a suitable handle at its end so that the eccentricity of pin 14 can be adjusted while the machine is running.

In this form of the invention pitman 15 has an indirect connection to slide 16 as by pivot 49 to rod 50 slidably mounted in slide 16 and mounting springs 51 and 52 at opposite ends, the tension being adjusted as at 51a and 52a.

As the slides reciprocate and alternately engage the stops further pitman travel for cycle rotation of plate 14a is permitted by the springs 51 and 52.

Reference will now be had to Figs. 2 and 3 wherein 114a indicates the eccentric plate, 136 the peripheral cam groove therein, 114d the stud carrying eccentric sleeve 114 terminating in worm wheel 114c. Shaft 144a, carrying a worm wheel 143 comparable to worm 43, is yieldingly clutched at 144b to shaft 144c mounting bevel gear 146 meshing with gear 147 for eccentric adjustment.

Herein the pitman rod is divided and includes end 115a associated with the adjustable eccentric and end 115b associated with pin 149 connected to portion 150 rigid with the slides.

Portion 115a is enlarged at 115c and externally threaded into tube 151 and locked thereto as at 151a. Tube 151 is slidable on portion 115b and same extends into the tube at 115d which is enlarged at 115e and threaded to take nut 115f. Included in the tube is spring 152.

Thus the eccentric wheel can rotate without slide damage for in effect the pitman rod in this form is elastic for eccentric adjustment accommodation etc.

Reference will now be had to the left hand portion of Fig. 2 and Fig. 4 as well as Fig. 1. In the first mentioned only the right hand slide 16 is illustrated. The left hand slide 17 is similar thereto except as noted hereinafter.

Rock shaft 41 is rotatably supported by and bridges the housing of the slide and suitably secured thereto as at 53, see Fig. 4, is a pair of links 54 pivotally connected at 55 to a pair of links 56 pivoted at 57 to the rack 16a.

A worm 58 and worm wheel 58a adjusts the eccentric pivots 57 by rotation of shaft 59. This provides proper rack and gear contact etc. Now when shaft 41 is rocked the links either are straightened out or angled. This toggle structure, therefore either advances the rack into gear mesh or demeshes same.

The two pairs of toggles are opposed in that when one pair is aligned, see Figs. 2 and 4 and Fig. 1 rack 16a is gear engaged and at the same time the other pair in slide 17 is angled or bent and rack 17a is demeshed. When shaft 41 is rocked oppositely the toggle pairs are bent and straightened and rack 16a is demeshed and rack 17a is engaged respectively.

Reference will now be had to Figs. 5, 6 and 7, wherein a cam type rack meshing and demeshing mechanism is illustrated. Herein the shaft 141 within the slide 16 includes a spline 141a and a pair of cams 60 are mounted thereon.

Each cam includes a slot 61 and disposed therein is roller 62 carried by pin 63 in turn carried by arm 64 upon rack 116a. The preferred shape of this slot is as shown in Fig. 8.

The depth of the slides are such that the two pairs of cams therein can be oscillated simultaneously. Also the cams in one slide box are disposed in reversed relation to the cams in the other slide box so that when they are up as it were the left hand rack is gear engaged and the right hand rack, see Fig. 1, is disengaged and when they are down as it were the right hand rack is engaged, see Figs. 5 and 6, and the left hand rack, see Fig. 1, is disengaged. Thus the racks are alternately engaged and disengaged as before.

The toggle type is preferred over the cam type because there is less wear in use. Of course if the wells 64a were deep enough and the aligned pins 63 were connected and have eccentric bearings in ears 62 and such eccentric structure be worm and wheel adjusted as shown in Figs. 2 and 4 at 58—59a the cam type can be adjusted for proper rack tooth clearance with relation to its associated gear just as the toggle type is adjustable for such purpose.

The primary advantages of the foregoing disclosed invention is that the acceleration can be controlled, the positive dwell period can be adjusted, the dwell adjustment can be effected while the device is operating, higher speeds can be employed because the movement for effecting engagement rack engagement and disengagement is very small, and the shiftable mass is very small, there is no possibility of the machine getting out of time because the rack and gear engagement is of radial character instead of axial character, or a modification thereof, with respect to the rack driven gear, and finally since both sides of the driving gears and idlers are used alternately, the gear life is at least twice as long, or expressed otherwise, the original accuracy is maintained at least twice as long.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a glass forming machine having a pair of step-by-step rotatable work tables, and a gear for each operatively associated together for conjoint movement, the combination therewith of a pair of spaced racks longitudinally aligned one with the other, each adapted for operative engagement with but one of the gears, mechanism for simultaneously reciprocating both racks, and other mechanism radially disposing one rack in engagement with its gear and radially disposing the other rack in radially spaced relation to its gear and vice versa.

2. A glass forming machine as defined by claim 1 wherein the first mentioned mechanism comprises an eccentric, a pitman, and an elastic connection between the eccentric and the racks.

3. A glass forming machine as defined by claim 2 wherein the first mentioned mechanism includes an eccentric and a pitman, and adjustable mechanism operatively associated with said eccentric for adjusting the latter, the adjustable mechanism terminating in a manually operable reciprocable member movable with the racks in the reciprocation thereof.

4. In a glass forming machine having a pair of step-by-step rotatable work tables, and a gear for each operatively associated together for conjoint movement, the combination therewith of a pair of spaced racks, longitudinally aligned one with the other, each adapted for operative engagement with but one of the gears, mechanism for simultaneously reciprocating both racks, and other mechanism radially disposing one rack in engagement with its gear and radially disposing the other rack in radially spaced relation to its gear and vice versa, the first mentioned mechanism including an eccentric pitman and a cam plate, the latter being continuously rotatable, and a follower operable by the cam plate in its rotation for operating said other mechanism in timed relation to the rack reciprocation.

5. In a glass forming machine having a pair of step-by-step rotatable work tables, and a gear for each operatively associated together for conjoint movement, the combination therewith of a pair of spaced racks, longitudinally aligned one with the other, each adapted for operative engagement with but one of the gears, mechanism for simultaneously reciprocating both racks, and other mechanism radially disposing one rack in engagement with its gear and radially disposing the other rack in radially spaced relation to its gear and vice versa, the first mentioned mechanism including an eccentric pitman and a cam plate, the latter being continuously rotatable, and a follower operable by the cam plate in its rotation for operating said other mechanism in timed relation to the rack reciprocation, the said other mechanism comprising a rock shaft, and a plurality of relatively movable members operatively connecting each rack and that shaft, shaft oscillation effecting rack movement toward and away from its gear, the rock shaft connected members of the relatively movable members for the racks being disposed in offset relation for effecting alternate rack displacement radially relative to the gears.

6. A glass machine as defined by claim 5 wherein a manually adjustable connection is interposed between each rack and the rack connected members for rack displacement and gear engagement adjustment.

7. A glass machine as defined by claim 5 wherein each pair of relatively movable members comprises a pair of toggle links.

8. A glass machine as defined by claim 5 wherein each pair of relatively movable members comprises a pair of toggle links and a manually adjustable connection is interposed between each rack and the rack connected members for rack displacement and gear engagement adjustment.

9. A glass machine as defined by claim 5 wherein each pair of relatively movable members comprises a cam and follower structure.

10. A glass machine as defined by claim 9 wherein the said structure comprises a cam slotted plate and a follower seated in the slot thereof.

11. A glass machine as defined by claim 10 wherein the plate is carried by the rock shaft and the follower is carried by the rack.

HEDWIG HAPPEL,
*Executrix for the Estate of Albert Wilhelm Happel, Deceased.*

REFERENCES CITED

The following references are of record in the file of this patent:

UNITED STATES PATENTS

| Number | Name | Date |
|---|---|---|
| 142,611 | Carothers | Sept. 9, 1873 |
| 172,428 | Haddock | Jan. 18, 1876 |
| 667,450 | McIndoe | Feb. 5, 1901 |
| 2,334,684 | Zappia | Nov. 16, 1943 |